(12) United States Patent
Taskar et al.

(10) Patent No.: US 8,465,190 B2
(45) Date of Patent: Jun. 18, 2013

(54) TOTAL INTERNAL REFLECTIVE (TIR) OPTIC LIGHT ASSEMBLY

(75) Inventors: Nikhil Taskar, Scarsdale, NY (US); Paul Ford, Orange, CT (US); David R. Pfund, Woodbridge, CT (US)

(73) Assignee: Sylvan R. Shemitz Designs Incorporated, West Haven, CT (US)

( * ) Notice: Subject to any disclaimer, the term of this patent is extended or adjusted under 35 U.S.C. 154(b) by 423 days.

(21) Appl. No.: 12/768,334

(22) Filed: Apr. 27, 2010

(65) Prior Publication Data

US 2010/0296283 A1 Nov. 25, 2010

Related U.S. Application Data

(60) Provisional application No. 61/180,461, filed on May 22, 2009.

(51) Int. Cl.
*F21V 7/04* (2006.01)

(52) U.S. Cl.
USPC .......................................... 362/555; 362/235

(58) Field of Classification Search
USPC ...................... 362/555, 219, 217.04, 244, 235
See application file for complete search history.

(56) References Cited

U.S. PATENT DOCUMENTS

| | | |
|---|---|---|
| 2,182,434 A | 12/1939 | Hohl |
| 2,194,841 A | 3/1940 | Welch |
| 3,646,338 A | 2/1972 | Goytisolo |
| 3,746,854 A | 7/1973 | Brass |
| 4,349,866 A | 9/1982 | Molnar |
| 6,260,982 B1 | 7/2001 | Huebner |
| 6,652,118 B2 | 11/2003 | Shemitz et al. |
| 6,860,618 B2 | 3/2005 | Shemitz et al. |
| 6,988,815 B1 | 1/2006 | Rizkin et al. |
| 7,029,148 B2 | 4/2006 | White et al. |
| 7,258,467 B2 | 8/2007 | Saccomanno et al. |
| 7,318,644 B2 | 1/2008 | Abu-Ageel |
| 7,465,071 B2 | 12/2008 | Beukert et al. |
| 2003/0193720 A1 | 10/2003 | Beach |

(Continued)

FOREIGN PATENT DOCUMENTS

| | | |
|---|---|---|
| EP | 1998102 A1 | 3/2008 |
| KR | 100756174 B1 | 9/2007 |
| KR | 10-2008-0063338 A | 7/2008 |
| WO | 02071812 A2 | 9/2002 |

OTHER PUBLICATIONS

English translation EP1998102, published Dec. 3, 2008.*

(Continued)

*Primary Examiner* — Mary Ellen Bowman
(74) *Attorney, Agent, or Firm* — Cantor Colburn LLP

(57) ABSTRACT

A total internal reflective (TIR) optic light bar includes a body having a first end portion that extends to a second end portion through an elongated intermediate portion. The body includes a light input surface having a curvilinear profile, a total internal reflective (TIR) surface, and at least one light output surface. The light input surface, TIR surface, and at least one light output surface defining a continuous outer surface of the body.

30 Claims, 12 Drawing Sheets

U.S. PATENT DOCUMENTS

| | | | |
|---|---|---|---|
| 2005/0135116 | A1 | 6/2005 | Epstein et al. |
| 2006/0209541 | A1 | 9/2006 | Peck |
| 2008/0089052 | A1 | 4/2008 | Katzir |
| 2008/0174993 | A1 | 7/2008 | Hsieh et al. |
| 2008/0247170 | A1 | 10/2008 | Peck |
| 2008/0266847 | A1 | 10/2008 | Chen |
| 2009/0027892 | A1 | 1/2009 | Bremerich et al. |
| 2009/0168395 | A1 | 7/2009 | Mrakovich et al. |
| 2009/0273948 | A1 | 11/2009 | Bryan et al. |
| 2010/0020543 | A1 | 1/2010 | Yiu et al. |
| 2010/0046242 | A1 | 2/2010 | Lambert et al. |
| 2010/0053973 | A1 | 3/2010 | Shastry et al. |

OTHER PUBLICATIONS

Notification of Transmittal of the International Search Report and the Written Opinion of the International Searching Authority, International Application No. PCT/US2010/034524, Dec. 15, 2010, 5 pages.

Written Opinion of the International Searching Authority, International Application No. PCT/US2010/034524, Dec. 15, 2010, 5 pages.

International Preliminary Report on Patentability for corresponding PCT Application No. PCT/US2010/034524, dated Nov. 22, 2011, pp. 1-6.

European Search Report for corresponding application EP 10 77 8117 dated Oct. 10, 2012, Mail date Oct. 18, 2012.

* cited by examiner

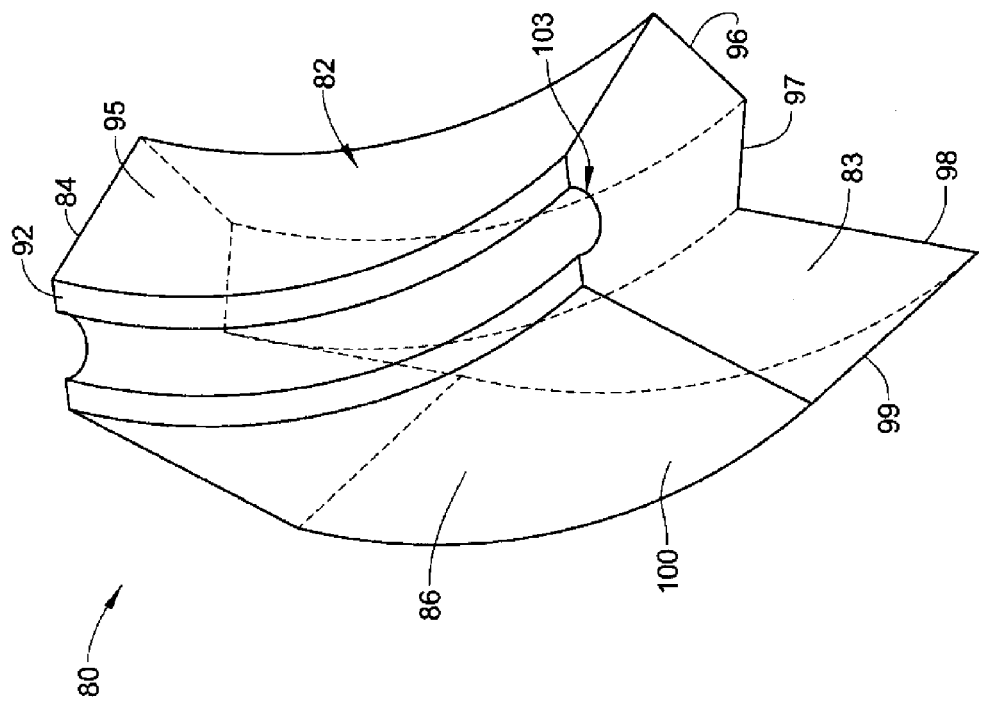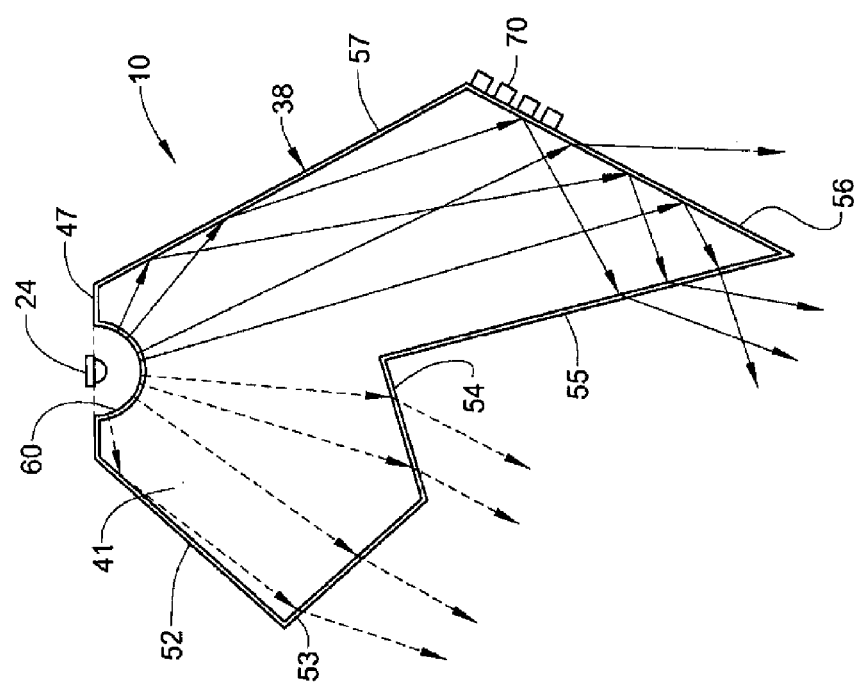

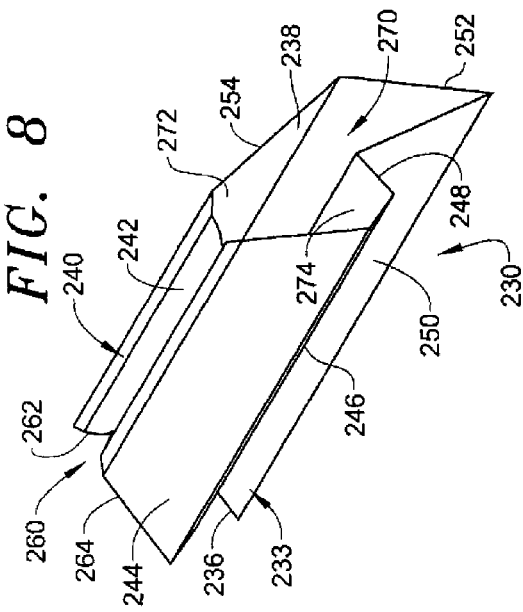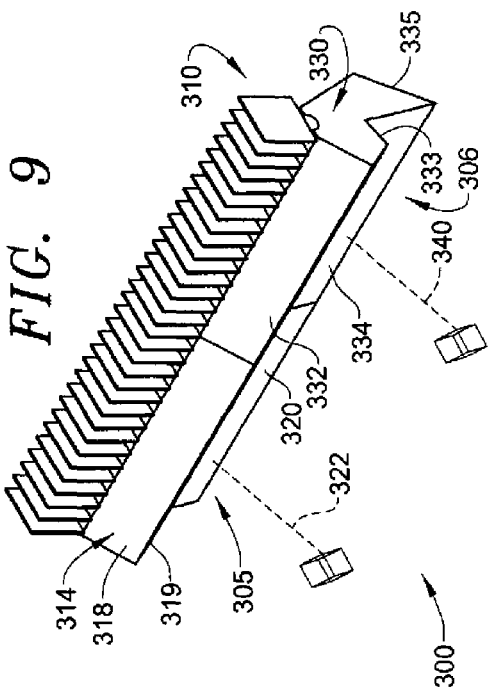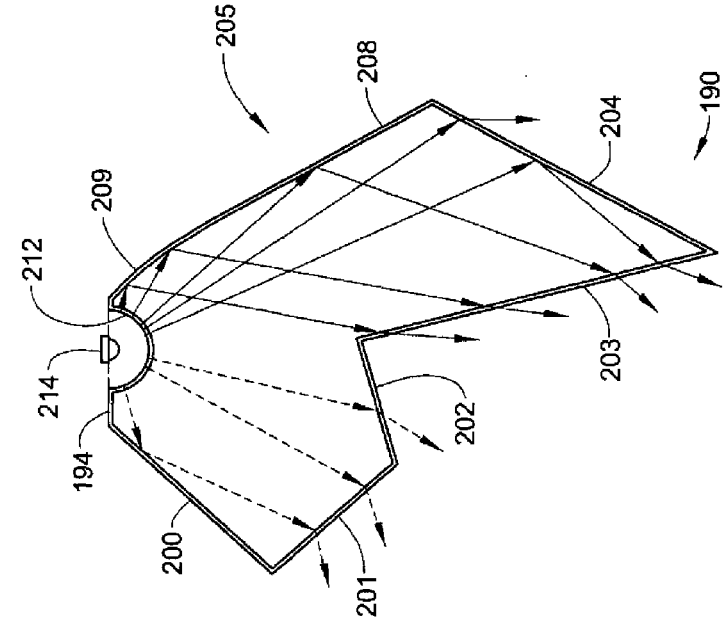

TOTAL INTERNAL REFLECTIVE (TIR) OPTIC LIGHT ASSEMBLY

CROSS-REFERENCE TO RELATED APPLICATIONS

This application claims the benefit of U.S. Provisional Application No. 61/180,461, entitled "Asymmetric Total Internal Reflective (TIR) Optic Light Assembly" filed on May 22, 2009.

BACKGROUND

The present invention relates to art of light assemblies and, more particularly, to a total internal reflective (TIR) optic light assembly.

Conventional light fixtures emit only a small fraction of generated light. For example, a standard fluorescent tube fixture that employs a reflector will emit between about fifty to about seventy percent of the produced light. Low efficiency of this magnitude requires that conventional lights have an increased size so as to produce enough light to adequately illuminate an object. This low efficiency also leads to significant energy waste. More specifically, increasing the size/power of a light to adequately illuminate an area necessarily requires an increased energy input. In addition, larger fixtures require additional space which in many cases detracts from an overall aesthetic, or appropriates space that could otherwise be put to better use.

SUMMARY

According to one exemplary embodiment, a total internal reflective (TIR) optic light bar includes a body having a first end portion that extends to a second end portion through an elongated intermediate portion. The body includes a light input surface having a curvilinear profile, a total internal reflective (TIR) surface, and at least one light output surface. The light input surface, TIR surface, and at least one light output surface define a continuous outer surface of the body.

According to another exemplary embodiment, a total internal reflective (TIR) optic light bar includes a body having a first end portion that extends to a second end portion through an elongated intermediate portion. The body includes a light input surface, a total internal reflective (TIR) surface, and at least one light output surface. The light input surface, TIR surface, and at least one light output surface define a continuous outer surface of the body.

According to yet another exemplary embodiment, a total internal reflective (TIR) optic light bar includes a body having a first end portion that extends to a second end portion through an elongated intermediate portion. The body includes a light input surface having a curvilinear profile, at least one total internal reflective (TIR) surface, and at least one light output surface.

According to still another exemplary embodiment, a method of illuminating an object includes emitting light from at least one light member, directing the light into a curvilinear light input surface of a total internal reflective (TIR) optic light bar including a body having a first end portion that extends to a second end portion through an elongated intermediate portion, re-directing the light with a TIR surface, and passing the light from the at least one TIR surface through a plurality of light output surfaces to establish a beam of light that is directed onto an object to be illuminated.

Additional features and advantages are realized through the techniques of the exemplary embodiments. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is an elevational side view of the TIR optic light bar portion of the light assembly of FIG. 2;

FIG. 4 is a lower left perspective view of a TIR optic light bar in accordance with another exemplary embodiment;

FIG. 7 is an elevational side view of the TIR optic light bar in accordance with still yet another exemplary embodiment;

FIG. 8 is a left perspective view of a TIR optic light bar having recessed end portions;

FIG. 9 is an upper right perspective view of a TIR optic light assembly in accordance with an another exemplary embodiment;

DETAILED DESCRIPTION

Figure 2:
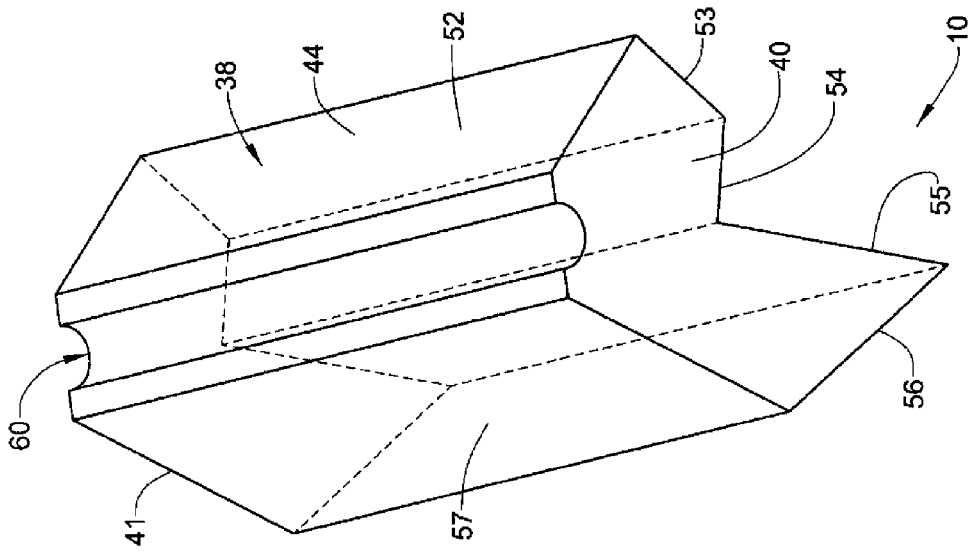
FIG. 2 is a lower left perspective view of a TIR optic light bar portion of the light assembly of FIG. 1.
Figure 1:
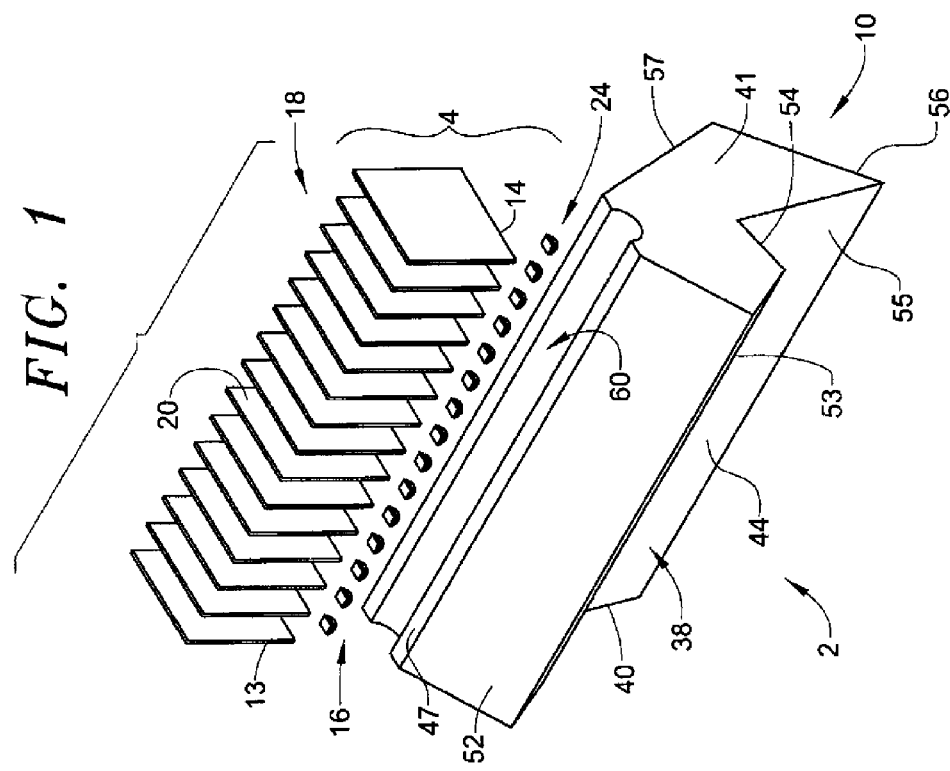
FIG. 1 is a lower right, exploded view, of a total internal reflective (TIR) optic light assembly in accordance with an exemplary embodiment.

With reference to FIGS. 1-3, a total internal reflective (TIR) optic light assembly constructed in accordance with an exemplary embodiment is indicated generally at 2. TIR assembly 2 includes a light engine module 4 and a TIR optic light bar 10. Light engine module 4 includes a first end 13 that extends to a second end 14 through a lighting zone 16. Light engine module 4 also includes a heat exchange member 18 having a plurality of heat exchange elements 20 as well as a plurality of light members, one of which is indicated at 24, arranged in a linear array between first and second ends 13 and 14. In the exemplary embodiment shown, light members 24 take the form of light emitting diodes (LEDs), however, it should be understood light members 24 can take on a variety of forms, such as fluorescent lighting as well as incandescent lighting. In addition, it should be understood that heat exchange member 18 can be located remotely from TIR optic light bar 10. If located remotely, heat exchange member 18 is thermally connected to TIR optic light bar 10 through, for example, one or more heat pipes (not shown).

In further accordance with the exemplary embodiment, TIR optic light bar 10 includes a main body 38 having a first end portion 40 that extends to a second end portion 41 through an elongated, multi-faceted intermediate portion 44. TIR optic light bar 10 includes a light input surface 47 and a plurality of light output surfaces 52-57 that define, at least in part, a plurality of refractive facets (not separately labeled) of multi-faceted intermediate portion 44. TIR optic light bar 10 is formed from a solid, transparent material, such as acrylic, polycarbonate, epoxy, glass, and silicone, such that light provided at light input surface 47 enters main body 38 and, as will be discussed more fully below reflects upward from light output surfaces 52-57. In accordance with one aspect of the invention, TIR optic light bar 10 is formed through a molding process. However, TIR optic light bar 10 can also be formed using a variety of other manufacturing techniques such as, for example, extrusion. In any event, TIR optic light bar 10 includes a light receiving element 60 arranged in light input surface 47. Light receiving element 60 takes the form of a channel that extends longitudinally between first and second end portions 40 and 41 within light input surface 47. However, it should be understood that light receiving element 60 can take on various other forms such as, a plurality of discrete channels or a plurality of individual openings each of which receive individual light members.

With particular reference to FIG. 3, light member 24 is shown arranged at light receiving element 60. When light member 24 is activated, rays of light (indicated by arrows) pass within main body 38 of TIR optic light bar 10. The rays of light reflect off internal or TIR surfaces (not separately labeled) of multi-faceted intermediate portion 44 before exiting through one or more light output surfaces 52-57. In accordance with an exemplary embodiment, the light rays originating at light member 24 can be directed asymmetrically to a particular focal point, and/or a particular aiming direction, depending upon design parameters. That is, by varying the lengths of light out put surfaces 52-57 and/or the angles between each light output surface 52-57, the light rays can be directed at any number of focal points and/or any number of particular aiming directions. For example, light output surface 52 can be arranged at an angle of between about 15-75 degrees, light out put surface 53 can be arranged at an angle of between approximately 0-75 degrees, light output surface 54 can be arranged at an angle of between about 45-105 degrees, light output surface 55 can be arranged at an angle of between about 15-45 degrees, light output surface 56 can be arranged at an angle of between about 0-45 degrees, and light output surface 57 can be arranged at an angle of between approximately 15-75 degrees. Of course it should be understood that the aforementioned angles are but an example. The actual angles of the light output surfaces can vary depending upon desired design parameters. In addition, it should be understood that the number and lengths of light output surfaces 52-57 can also vary.

In addition, internal reflection can be enhanced and/or excitance in an undesirable direction can be suppressed through the use of a reflector member 70 mounted to an external surface of, for example, light output surface 56. Reflector member 70 can either fully or partially cover light output surface 56. Partial coverage can also include patterned coverage. It should also be understood that light output surfaces such as 53, 54, 55 can be provided with micro-optical features (not shown) such as micro-prism arrays, micro-lens arrays and/or geometrical array patterns (one or two dimensional). The micro-optical features enhance angular homogenizing/smoothening of the beam pattern to prevent formation of striations/banding in the luminance levels achieved on the object being illuminated.

Reference will now be made to FIG. 4 in describing a TIR optic light bar 80 constructed in accordance with another exemplary embodiment. TIR optic light bar 80 includes a main body 82 having a first end portion 83 that extends to a second end portion 84 through an elongated, multi-faceted intermediate portion 86. In the exemplary embodiment shown, elongated, multi-faceted intermediate portion 86 is curvilinear such that TIR optic light bar 80 can be mounted to a curvilinear surface. The particular curvature of the curvilinear surface can vary depending upon application type and design requirements. In a manner similar to that described above, TIR optic light bar 80 includes a light input surface 92 as well as a plurality of light output surfaces 95-100 that define, at least in part, a plurality of refractive facets (not separately labeled) of multi-faceted intermediate portion 86. In addition, TIR optic light bar 80 is provided with a light receiving element 103. In a manner also similar to that described above, light receiving element 103 is configured to receive one or more light receiving members (not shown) that produce a light beam that is reflected within TIR optic light bar 80 and directed outward from output surfaces 95-100 onto an object to be illuminated.

Figure 5:
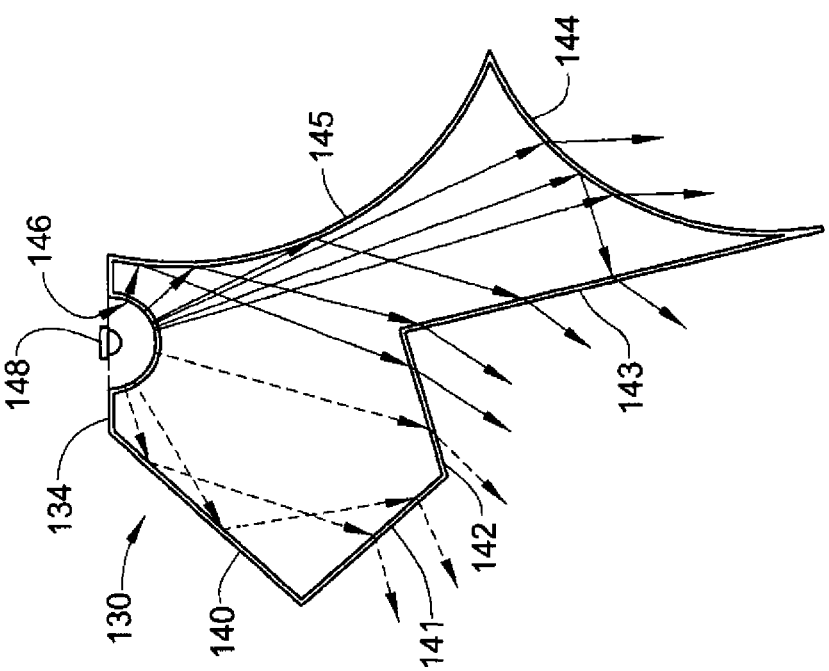
FIG. 5 is an elevational side view of the TIR optic light bar in accordance with yet another exemplary embodiment.

Reference will now be made to FIG. 5 in describing a TIR optic light bar 130 constructed in accordance with yet another exemplary embodiment. TIR optic light bar 130 includes a light input surface 134 and a plurality of light output surfaces 140-145 that define, at least in part, a plurality of refractive facets (not separately labeled). A light receiving element 146 is arranged within light input surface 134 and configured to receive a light member 148. In the exemplary embodiment shown, light output surfaces 144 and 145 are curvilinear having an internal convex surface. The curvilinear or convex surface provides additional focusing of light beams reflecting within TIR optic light bar 130. More specifically, a portion of the light emitted from light member 148 contacts internal reflective surfaces of light output surfaces 144 and 145 prior to being directed to others of the light output surfaces 141, 142 and 143. The particular curvature of light output surface 144 and 145 operates to focus the beams of light reflecting within TIR optic light bar 130 so as to provide a uniform illumination. Of course, the particular curvature, shape and symmetry of the curvilinear surfaces can vary depending upon desired design characteristics.

Figure 6:
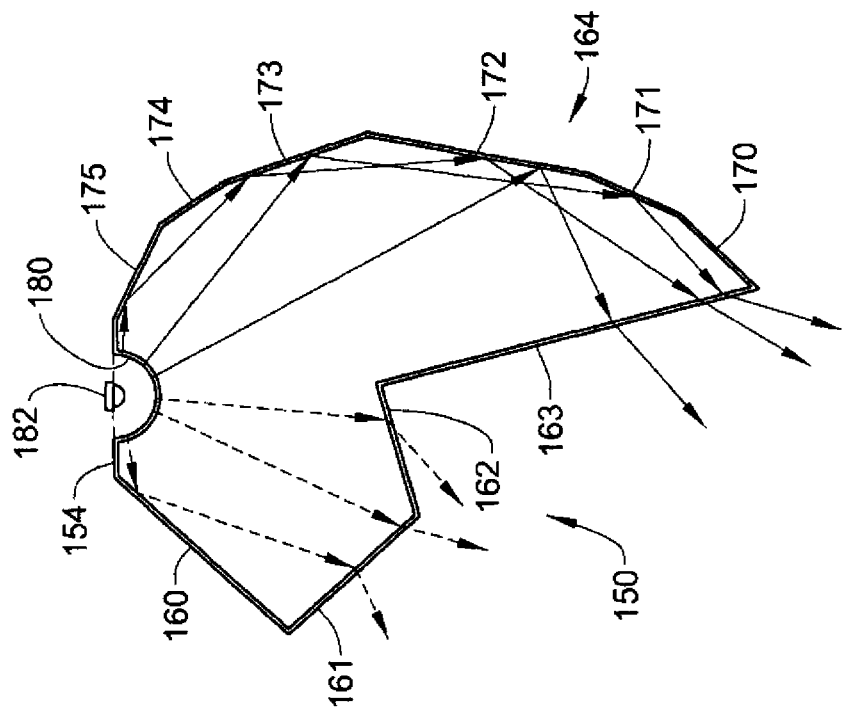
FIG. 6 is an elevational side view of the TIR optic light bar in accordance with still another exemplary embodiment.

Reference will now be made to FIG. 6 in describing a TIR optic light bar 150 constructed in accordance with yet another exemplary embodiment. TIR optic light bar 150 includes a light input surface 154 and a plurality of light output surfaces 160-164 that define, at least in part, a plurality of refractive facets (not separately labeled). Light output surface 164 can be formed as a gradual, continuous, curve or, as shown, as a plurality of discrete segments 170-175 that form a curvilinear surface. TIR optic light bar 150 also includes a light receiving element 180 arranged within light input surface 154. Light receiving element 180 is configured to receive a light member 182. In the exemplary embodiment shown, light output surface 164 is curvilinear having an internal concave surface. The curvilinear or concave surface provides additional focusing of light beams reflecting within TIR optic light bar 150. More specifically, a portion of the light emitted from light member 182 contacts internal reflective surfaces of light output surface 164 prior to being directed to other of the light output surfaces 160-163. The particular curvature of light output surface 164 operates to focus the beams of light reflecting within TIR optic light bar 150 so as to provide a uniform illumination. Of course, the particular curvature, shape and symmetry of the curvilinear surfaces can vary depending upon desired design characteristics.

Reference will now be made to FIG. 7 in describing a TIR optic light bar 190 constructed in accordance with yet another exemplary embodiment. TIR optic light bar 190 includes a light input surface 194 and a plurality of light output surfaces 200-205 that define, at least in part, a plurality of refractive facets (not separately labeled). In the exemplary embodiment shown, light output surface 205 includes a first or linear portion 208 that extends to a second or curvilinear portion 209. TIR optic light bar 190 also includes a light receiving element 212 is arranged within light input surface 194. In a manner similar to that described above, light receiving element 212 is configured to receive a light member 214. In the exemplary embodiment shown, second or curvilinear portion 209 of light output surface 205 provides additional focusing of light beams reflecting within TIR optic light bar 190. More specifically, a portion of the light emitted from light member 148 contacts curvilinear portion 209 of light output surface 205 prior to being directed to others of the light output surfaces 200-204. The particular curvature of light output surface 209, combined with linear section 208 operate to focus the beams of light reflecting within light bar 190 so as to provide a uniform illumination. Of course, the particular curvature, shape and symmetry of the curvilinear surfaces can vary depending upon desired design characteristics.

Reference will now be made to FIG. 8 in describing a TIR optic light bar 230. TIR optic light bar 230 includes a main body 233 having a first end portion 236 that extends to a second end portion 238. Light bar 230 includes a light input surface 240 having a light receiving element 242 and a plurality of light output surfaces, 244, 246, 248, 250, 252 and 254 that define, at least in part, a plurality of refractive facets (not separately labeled). In the exemplary embodiment shown TIR optic light bar includes a first recessed end portion 260 having first and second light output surfaces 262 and 264 and a second recessed end portion 270 having first and second light output surfaces 272 and 274. With this arrangement, TIR optic light bar 230 not only focuses light to forward and aft but also provides focused beams of light from end portions 236 and 238.

Reference will now be made to FIG. 9 in describing a TIR optic light assembly 300 constructed in accordance with yet another exemplary embodiment. Light assembly 300 includes a first TIR optic light bar 305 connected to a second TIR optic light bar 306. First and second TIR optic light bars 305 and 306 are provided with a single light engine module 310. In the exemplary arrangement shown, first TIR optic light bar 305 includes a main body 314 having a plurality of light output surfaces, three of which are indicated at 318-320 that define, at least in part, a plurality of refractive facets (not separately labeled). Light output surfaces 318-320 are configured to guide a first asymmetrical beam of light 322 in a first orientation. Similarly, second TIR optic light bar 306 includes a main body 330 including a plurality of light output surfaces 332-335 that are configured to emit a second asymmetric beam of light 340 in a second orientation. In a manner similar to that described above, light output surfaces 332-335 define, at least in part, a plurality of refractive facets (not separately labeled). With this arrangement, multiple light bars can be connected to provide a lighting effect having multiple focal points and/or aiming directions. That is, light assembly 300 includes multiple TIR optic light bars each having a particular distribution of focal points/aiming directions, such that various objects arranged at various distances from light assembly 300 are subjected to uniform levels of illumination.

Figure 10:
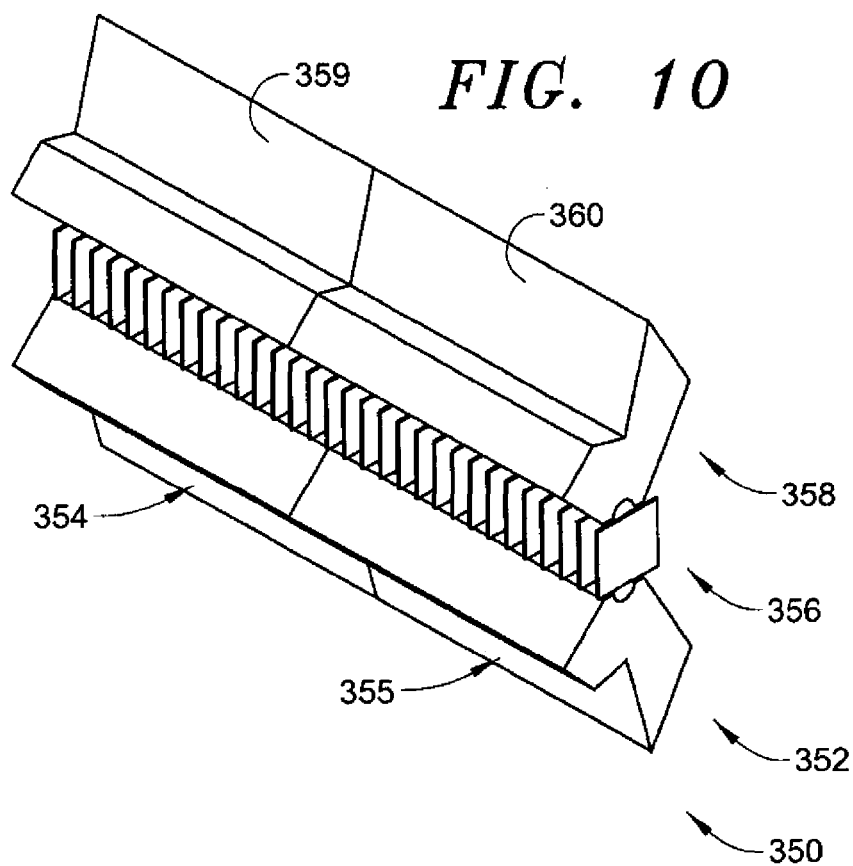
FIG. 10 is a lower left perspective view of a TIR optic light assembly in accordance with yet another exemplary embodiment.
Figure 11:
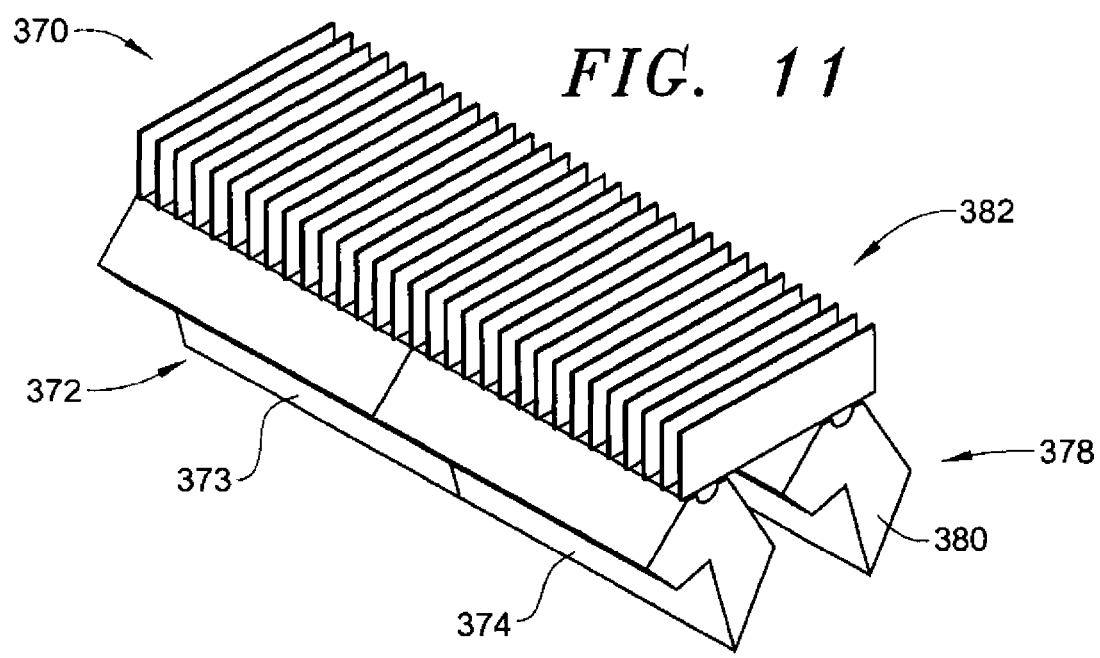
FIG. 11 is an upper right perspective view of a TIR optic light assembly in accordance with still another exemplary embodiment.

At this point it should be understood that the particular arrangement of light bars can vary. For example, FIG. 10 illustrates a TIR optic light assembly 350 including a first TIR optic light bar assembly 352 having a first TIR optic light bar 354 and a second TIR optic light bar 355 arranged on a first side of a light engine module 356, and a second TIR optic light bar assembly 358 having first TIR optic light bar 359 and a second TIR optic light bar 360 arranged on a second, opposing side of a light engine module 356. FIG. 11 illustrates a TIR optic light assembly 370 including a first TIR light bar assembly 372 having first TIR optic light bar 373 and a second TIR optic light bar 374, and a second TIR light bar assembly 378 having first TIR optic light bar (not shown) and a second TIR optic light bar 380 arranged on one side of a light engine module 382.

Figure 12:
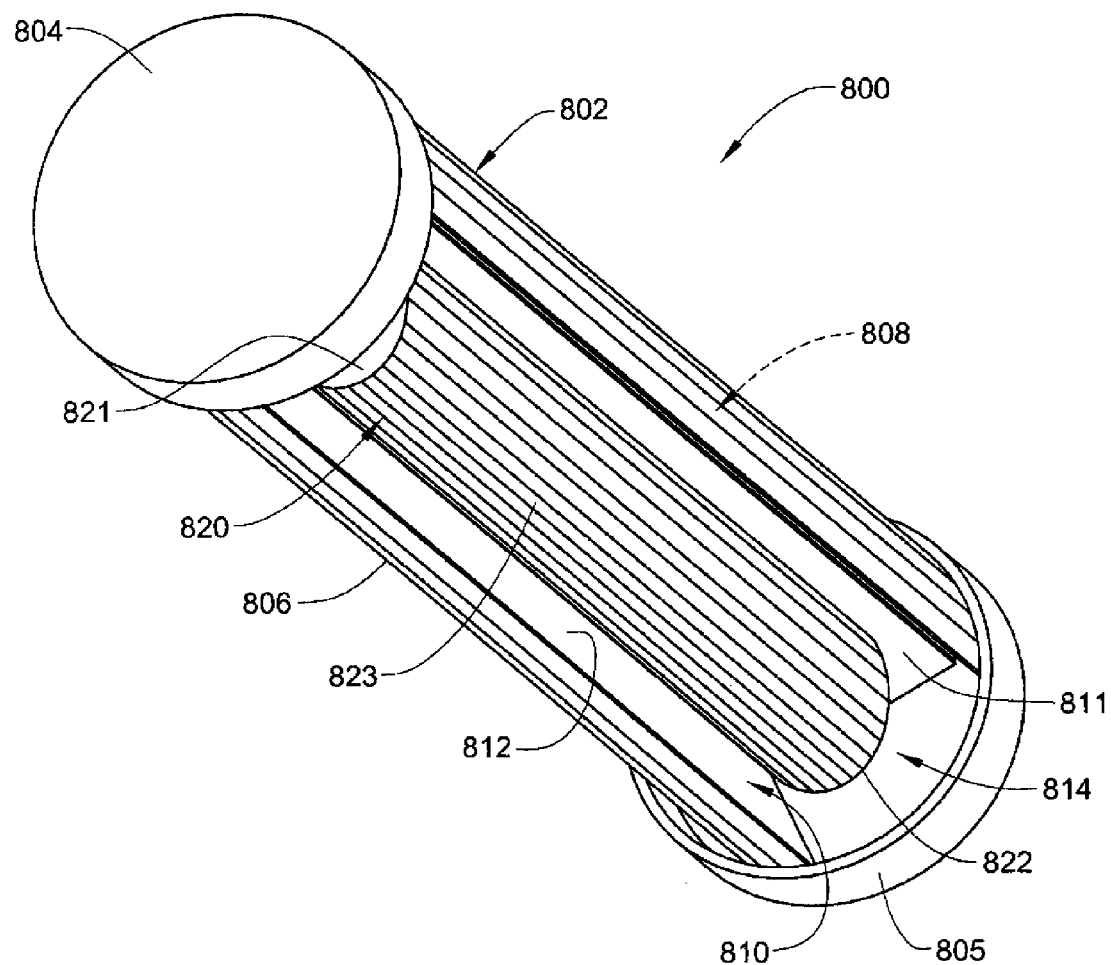
FIG. 12 is a lower left perspective view of a TIR optic light assembly in accordance with yet another exemplary embodiment.

Reference will now be made to FIG. 12 in describing a TIR optic light assembly 800 constructed in accordance with yet another exemplary embodiment. TIR optic Light assembly 800 includes a body 802 having a first end 804 that extends to a second end 805 through an intermediate portion 806. TIR optic light assembly 800 includes a housing portion 808 that houses a light engine module (not shown) and a heat exchange member (also not shown), and a light bar portion 810. Light bar portion 810 includes first and second surfaces 811 and 812 that support a TIR optic light bar 814. TIR optic light bar 814 includes a main body 820 having first end portion 821 that extends to a second end portion 822 through an elongated multi-faceted intermediate portion 823.

Figure 13:
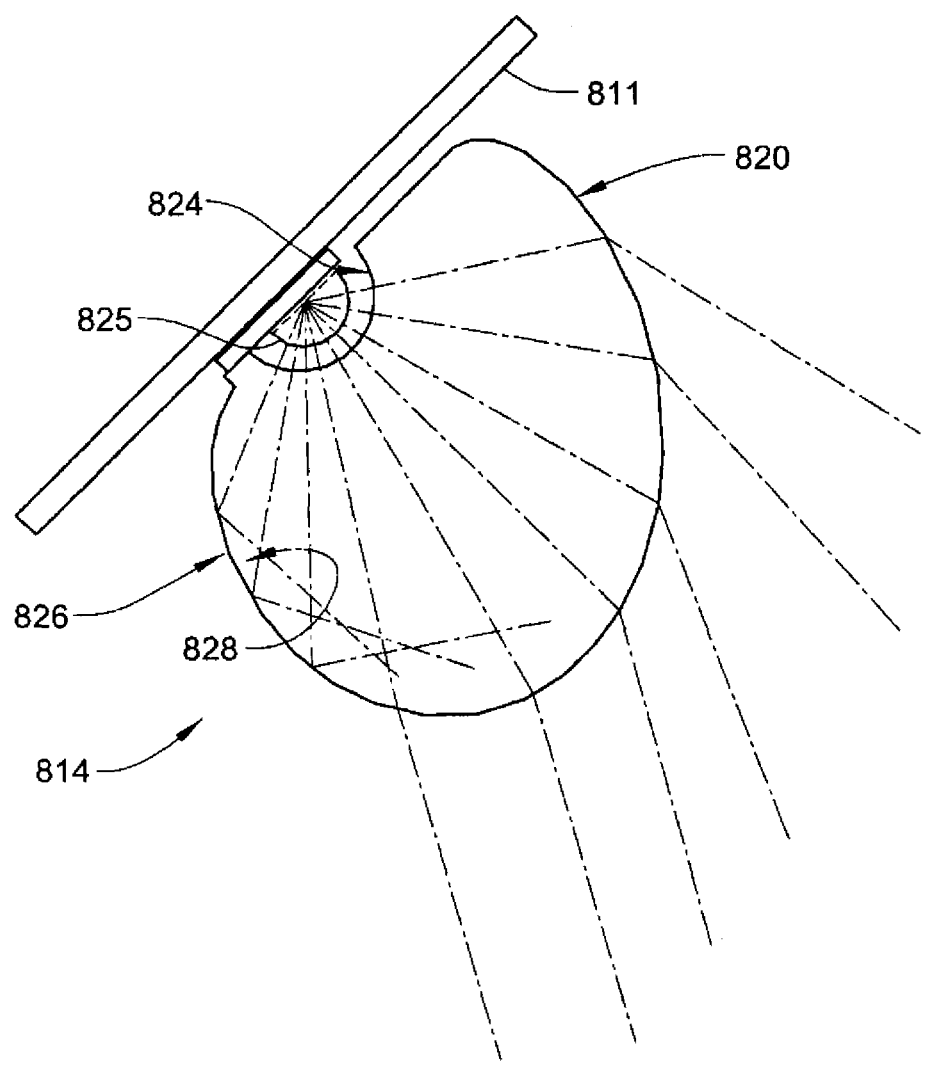
FIG. 13 an elevational side view of a TIR optic light bar portion of the TIR optic light assembly of FIG. 12.

As best shown in FIG. 13, TIR optic light bar 814 includes a light input surface 824 that receives light from a at least one LED 825. In the exemplary embodiment shown, light input surface 824 includes a curvilinear profile. TIR optic light bar 814 includes a multifaceted light output surface 826. More specifically, multifaceted light output surface 826 includes a plurality of refractive facets (not separately labeled) that guide light produced by LED 825 onto an object. In accordance with one aspect of the exemplary embodiment, multifaceted light output surface 826 guides light asymmetrically onto the object as will be discussed more fully below. TIR optic light bar 814 is formed from a solid, transparent material, such as acrylic, polycarbonate, epoxy, glass, and silicone, such that light provided at light input surface 824 enters main body 820. A portion of the light entering main body 820 exits directly through multifaceted light output surface 826. Another portion of the light is reflected internally off of total internal reflective surfaces indicated generally at 828 before exiting through multifaceted light output surface 826.

Figure 14:
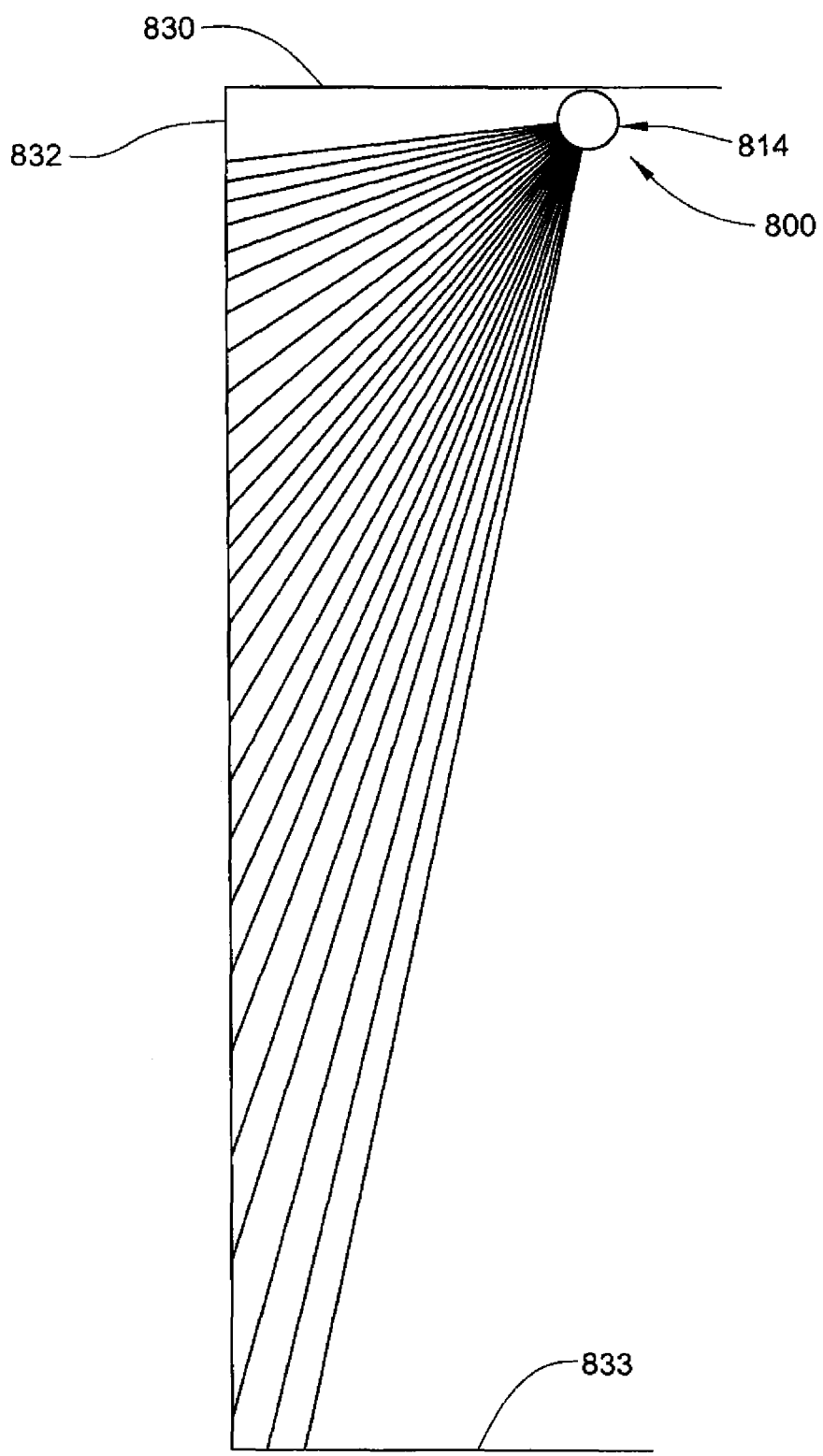
FIG. 14 is an elevational view of the TIR optic light bar of FIG. 13 illuminating a wall.

As best shown in FIG. 14, TIR optic light assembly 800, when mounted to a ceiling 830 is configured to guide light onto an adjacent wall 832. In accordance with one aspect of the exemplary embodiment, TIR optic light bar 814 is configured to guide light asymmetrically onto wall 832. More specifically, TIR optic light bar 814 is designed to enhance light that is directed onto wall 832 while minimizing any light that may wash onto ceiling 830 or onto an adjacent floor 833.

With this arrangement, TIR optic light assembly 800 is designed to increase light output efficiency by directing light only onto those surfaces requiring illumination. Moreover, by utilizing internal reflective surfaces, TIR optic light assembly 800 realizes optic losses of 1% or less. In contrast, light assemblies that employ reflectors realize optic losses of 10% or more.

Figure 15:
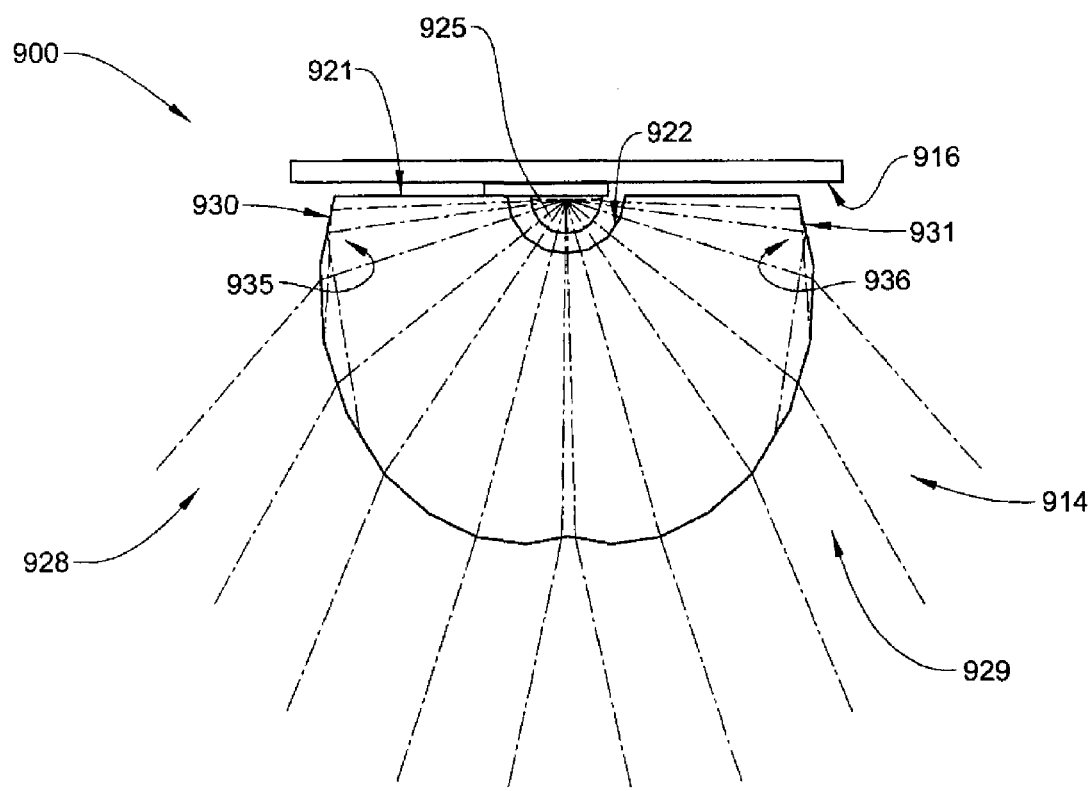
FIG. 15 is an elevational side view of a TIR optic light bar portion of a TIR optic light assembly in accordance with still another exemplary embodiment.

Reference will now be made to FIG. 15 in describing a TIR optic light assembly 900 constructed in accordance with still anther exemplary embodiment. TIR optic light assembly 900 includes a TIR optic light bar 914 mounted to a support surface 916. TIR optic light bar 914 includes a main body 921 having a light input surface 922 configured to receive light from an LED 925. In a manner similar to that described above, light input surface 922 is curvilinear. TIR optic light bar 914 includes first and second multifaceted light output surfaces 928 and 929. Each multifaceted light output surface 928 and 929 includes a plurality of refractive facets (not separately labeled). More specifically, first multifaceted light output surface 928 is configured to guide light in a first direction, and second multifaceted light output surfaces 929 is configured to guide light in a second direction. In accordance with one aspect of the exemplary embodiment, first and second multifaceted light out put surfaces 928 and 929 are configured to guide light asymmetrically as will be detailed more fully below.

Figure 16:
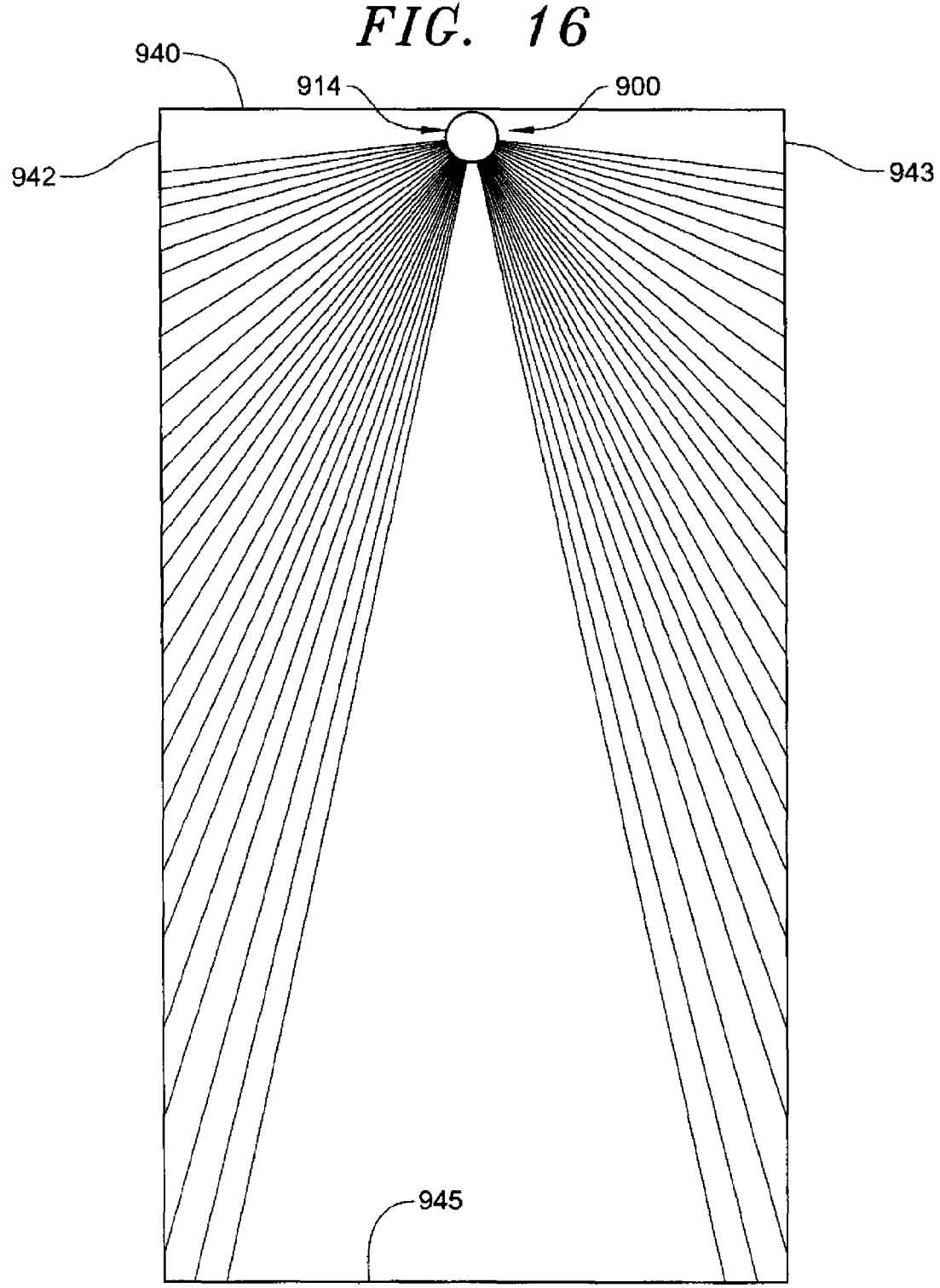
FIG. 16 is an elevational view of the TIR optic light bar of FIG. 15 illuminating two opposing walls.

In a manner similar to that described above, TIR optic light bar 914 is formed from a solid, transparent material, such as acrylic, polycarbonate, epoxy, glass, and silicone, such that light provided at light input surface 922 enters main body 921. A portion of the light entering main body 921 exits directly through multifaceted light output surfaces 928 and 929. Another portion of the light is reflected internally off of total internal reflective surfaces indicated generally at 935 and 936 before exiting through light output surfaces 928 and 929. More specifically, when mounted to, for example, a ceiling 940 such as shown in FIG. 16, multifaceted light output surface 928 directs light from LED 925 onto a first wall 942, while multifaceted light output surfaces 929 direct light from LED 925 onto a second, opposing wall, 943. In accordance with one aspect of the exemplary embodiment, multifaceted light output surfaces direct light asymmetrically onto walls 942 and 943, so as to minimize light washing onto ceiling 940 and a floor 945. TIR optic light assembly 900 is designed to increase light output efficiency by directing light only onto those surfaces requiring illumination.

Figure 17:
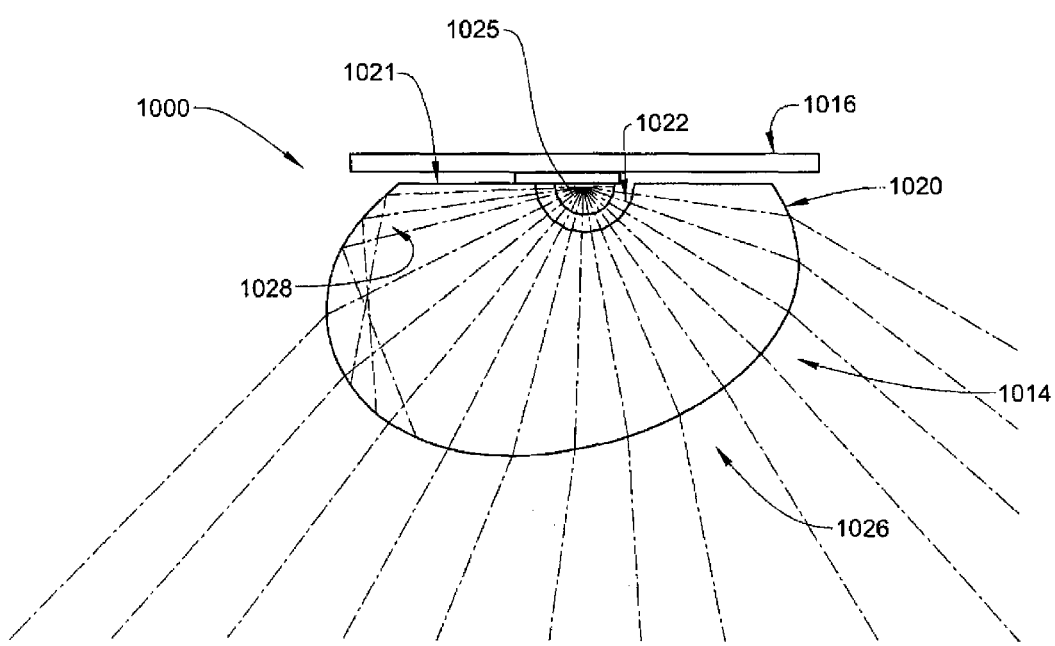
FIG. 17 is an elevational side view of a TIR optic light bar portion of a TIR optic light bar assembly configured for task lighting in accordance with yet another exemplary embodiment.

Reference will now be made to FIG. 17 in describing a TIR optic light bar assembly 1000 configured for task lighting. TIR optic light bar assembly 1000 includes TIR optic light bar 1014 including a main body 1020 including a light input surface 1022 that receives light from at least one LED 1025. In the exemplary embodiment shown, light input surface 1025 includes a curvilinear profile. TIR optic light bar 1000 includes a multifaceted light output surface 1026. More specifically, multifaceted light output surface 1026 includes a plurality of refractive facets (not separately labeled) that guide light produced by LED 1025 through a plurality of facets (not separately labeled) toward an object. In accordance with one aspect of the exemplary embodiment, multifaceted light output surface 1026 guides light asymmetrically onto the object as will be discussed more fully below. TIR optic light bar 1000 is formed from a solid, transparent material, such as acrylic, polycarbonate, epoxy, glass, and silicone, such that light provided at light input surface 1022 enters main body 1020. A portion of the light entering main body 1020 exits directly through multifaceted light output surface 1026. Another portion of the light is reflected internally off of total internal reflective surfaces indicated generally at 1028 before exiting through multifaceted light output surface 1026.

Figure 18:
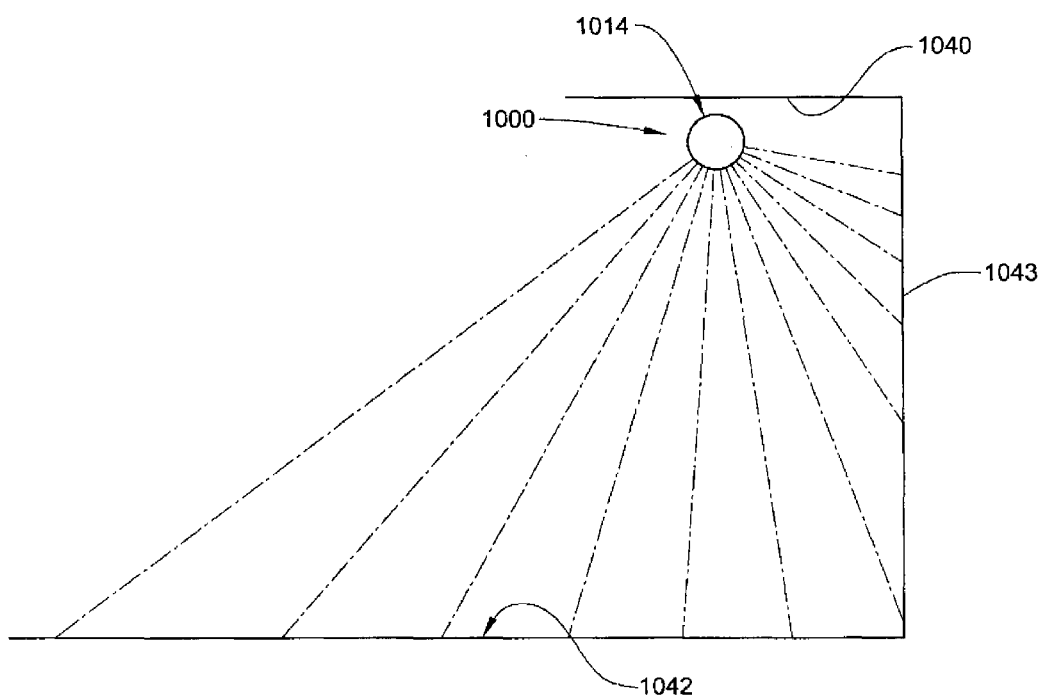
FIG. 18 is an elevational view of the TIR optic light bar of FIG. 17 illuminating a task surface and an adjacent wall.

As best shown in FIG. 18, TIR optic light assembly 1000, when mounted to, for example, an underside of a shelf 1040 is configured to guide light onto an opposing task surface 1042 and an adjacent wall 1043. In accordance with one aspect of the exemplary embodiment, multifaceted light output surface 1026 of TIR optic light bar 1014 is configured to guide light asymmetrically onto task surface 1042 and wall 1043. More specifically, TIR optic light bar 1014 is designed to enhance light that is directed onto task surface 1042 and wall 1043 while minimizing any light that projected toward a person sitting adjacent task surface 1042. With this arrangement, TIR optic light assembly 1000 is designed to increase light output efficiency by directing light only onto those surfaces requiring illumination. Moreover, by utilizing internal reflective surfaces, TIR optic light assembly 1000 realizes optic losses of 1% or less. In contrast, light assemblies that employ reflectors realize optic losses of 10% or more. The higher efficiency leads to lower energy consumption and the ability to use lights that consume less power than conventional models without suffering a loss of lighting.

At this point, it should be understood that the exemplary embodiments provide an apparatus for establishing both symmetric and asymmetric illumination of an object. In the case of TIR optic light bars, light is guided within an interior portion of an asymmetric TIR optic light bar having a multifaceted surface with the surfaces being configured to direct the light beam onto an object to be illuminated. In the case of reflector systems, the light is directed away from a target surface and reflected back to provide an even wash of light across the target surface to substantially reduce glare and substantially eliminate eye fatigue. While the preferred embodiments have been shown and described, it should be understood that those skilled in the art, both now and in the future, may make various improvements and enhancements which fall within the scope of the claims which follow.

What is claimed is:

1. A total internal reflective (TIR) optic light bar comprising:
    a body including a first end portion that extends to a second end portion through an elongated intermediate portion,
    the body including a light input surface having a curvilinear profile, a total internal reflective (TIR) surface, and at least one light output surface,
    the light input surface, TIR surface, and at least one light output surface defining a continuous outer surface of the body,
    wherein the elongated intermediate portion, the light input surface, the TIR surface, and the at least one light output surface, each terminate on one side of the first end portion of the body and on a second side at the second end portion of the body.

2. A total internal reflective (TIR) optic light bar comprising:
    a body including a first end portion that extends to a second end portion through an elongated intermediate portion,
    the body including a light input surface, a total internal reflective (TIR) surface, and at least one light output surface,
    the light input surface, TIR surface, and at least one light output surface defining a continuous outer surface of the body,
    wherein the elongated intermediate portion, the light input surface, the TIR surface, and the at least one light output surface, each terminate on one side of the first end portion of the body and on a second side at the second end portion of the body.

3. The TIR optic light bar according to claim 2, wherein the TIR surface and the at least one light output surface are arranged at a non-perpendicular angle relative to the light input surface.

4. The TIR optic light bar according to claim 2, wherein the at least one light output surface is a multi-faceted light output surface.

5. The TIR optic light bar according to claim 4, wherein the multifaceted light output surface includes a plurality of refractive facets.

6. The TIR optic light bar according to claim 4, wherein the multifaceted light output surface defines a curvilinear profile.

7. The TIR optic light bar according to claim 4, wherein multifaceted light output surface includes a first multifaceted light output surface configured to direct light in a first direction and a second multifaceted light output surface configured to direct light in a second direction.

8. The TIR optic light bar according to claim 2, further comprising: at least one light emitting diode (LED) positioned adjacent the light input surface.

9. The TIR optic light bar according to claim 8, wherein the at least one LED comprises a plurality of LEDs positioned adjacent the light input surface.

10. The TIR optic light bar according to claim 2, wherein the light input surface extends, uninterrupted, between the first end portion and the second end portion of the body.

11. The TIR optic light bar according to claim 2, wherein the elongated intermediate portion extends linearly along a longitudinal axis.

12. A total internal reflective (TIR) optic light bar comprising:
a body including a first end portion that extends to a second end portion through an elongated intermediate portion defining an axial dimension of the body,
the body including a light input surface having a curvilinear profile, at least one total internal reflective (TIR) surface, and at least one light output surface,
wherein each of the elongated intermediate portion, the light input surface, the at least one TIR surface, and the at least one light output surface have a dimension substantially similar to the axial dimension. of the body and on a second side at the second end portion of the body.

13. The TIR optic light bar according to claim 12, wherein the light input surface extends continuously between the first end portion and the second end portion.

14. The TIR optic light bar according to claim 13, wherein the light input surface extends continuously and uninterrupted between the first end portion and the second end portion.

15. The TIR optic light bar according to claim 13, further comprising: a plurality of light members positioned adjacent the light input surface, the plurality of light members emitting light into the body.

16. The TIR optic light bar according to claim 15, wherein the light input surface includes a channel that extends longitudinally between the first end portion and the second end portion.

17. The TIR optic light bar according to claim 16, wherein the plurality of light members are positioned in the channel, each of the light members emitting light into the body through the light input surface.

18. The TIR optic light bar according to claim 12, wherein the light input surface comprises a non-light modifying surface, the non-light modifying surface passing light into the body without imparting any refraction.

19. The TIR optic light bar according to claim 12, wherein the at least one light output surface is a multi-faceted light output surface including a plurality of refractive facets.

20. The TIR optic light bar according to claim 19, wherein each of the plurality of refractive facets are substantially tangent to adjacent ones of the plurality of refractive facets thereby defining a curvilinear profile.

21. The TIR optic light bar according to claim 19, wherein the multi-faceted light output surface includes a first multifaceted light output surface configured to direct light in a first direction and a second multi-faceted light output surface configured to direct light in a second direction.

22. The TIR optic light bar according to claim 12, wherein the elongated intermediate portion extends linearly along a longitudinal axis.

23. A method of illuminating an object, the method comprising:
emitting light from at least one light member;
directing the light into a curvilinear light input surface of a total internal reflective (TIR) optic light bar including a body having an elongated intermediate portion that extends from a first end portion and terminates at a second end portion;
re-directing the light with a TIR surface that extends from the first end portion and terminates at the second end portion; and
passing the light from the at least one TIR surface through a plurality of light output surfaces that extend from the first end portion and terminate at the second end portion to establish a beam of light that is directed onto an object to be illuminated.

24. The method of claim 23, wherein establishing the beam of light includes guiding the beam of light asymmetrically onto a wall while minimizing light washing onto adjacent surfaces.

25. The method of claim 23, further comprising:
passing the light through a first plurality of light output surfaces and establishing a first beam of light aimed in a first direction; and
passing the light through a second plurality of light output surfaces and establishing a second beam of light aimed in a second direction, the first direction being distinct from the second direction.

26. The method of claim 25, wherein said establishing the first beam of light in the first direction includes guiding the first beam of light asymmetrically onto a first wall while minimizing light washing onto adjacent surfaces.

27. The method of claim 26, wherein said establishing the second beam of light in the second direction includes guiding the second beam of light asymmetrically onto a second, opposing wall while minimizing light washing onto other adjacent surfaces.

28. The method of claim 23, wherein emitting light from at least one light member comprises emitting light from a plurality of LED's arranged adjacent to the curvilinear light input surface.

29. The TIR optic light bar according to claim 12. wherein the axial dimension is substantially linear.

30. The TIR optic light bar according to claim 12, wherein the axial dimension is curvilinear.

* * * * *